(12) United States Patent
Ugur et al.

(10) Patent No.: US 9,123,078 B2
(45) Date of Patent: Sep. 1, 2015

(54) METHOD AND APPARATUS FOR SOCIALLY AWARE APPLICATIONS AND APPLICATION STORES

(75) Inventors: Kemal Ugur, Tampere (FI); Petros Belimpasakis, Tampere (FI)

(73) Assignee: Nokia Technologies Oy, Espoo (FI)

( * ) Notice: Subject to any disclaimer, the term of this patent is extended or adjusted under 35 U.S.C. 154(b) by 820 days.

(21) Appl. No.: 13/213,568

(22) Filed: Aug. 19, 2011

(65) Prior Publication Data

US 2013/0047146 A1 Feb. 21, 2013

(51) Int. Cl.
*G06F 9/445* (2006.01)
*G06Q 50/00* (2012.01)
*G06Q 30/06* (2012.01)

(52) U.S. Cl.
CPC *G06Q 50/01* (2013.01); *G06F 8/61* (2013.01); *G06Q 30/0601* (2013.01)

(58) Field of Classification Search
CPC .............. G06F 8/60; G06F 8/61; G06Q 50/01
USPC ................................. 717/168–178
See application file for complete search history.

(56) References Cited

U.S. PATENT DOCUMENTS

| | | | |
|---|---|---|---|
| 6,966,060 | B1 | 11/2005 | Young et al. |
| 8,566,960 | B2 * | 10/2013 | Richardson ............ 726/32 |
| 2003/0060157 | A1 | 3/2003 | Henrick |
| 2003/0221190 | A1 | 11/2003 | Deshpande et al. |
| 2004/0088399 | A1 | 5/2004 | Minari |
| 2005/0108369 | A1 | 5/2005 | Sather et al. |
| 2009/0241104 | A1 | 9/2009 | Amiga et al. |
| 2010/0332634 | A1 | 12/2010 | Keys |
| 2013/0124619 | A1 * | 5/2013 | Steakley ............ 709/203 |

FOREIGN PATENT DOCUMENTS

| | | |
|---|---|---|
| EP | 2 175 612 A1 | 4/2010 |
| EP | 2 418 832 A1 | 2/2012 |
| WO | WO 2008/147548 A1 | 12/2008 |

OTHER PUBLICATIONS

Nickinson, "How to install Android apps", May 2011, retrieved from http://www.androidcentral.com/android-apps-install, 7 pages.*
Miller, "Four available phone application stores; who has the best terms?", May 2009, ZDNet, retrieved from http://www.zdnet.com/blog/cell-phones/four-available-phone-application-stores-who-has-the-best-terms/1296, 5 pages.*

(Continued)

*Primary Examiner* — Ted T Vo
(74) *Attorney, Agent, or Firm* — Ditthavong & Steiner, P.C.

(57) ABSTRACT

An approach is provided for social networking-based item installation. A social network platform receives a request from at least one device, a service, or a combination to initiate an installation of at least one item. The platform processes and/or facilitates a processing of information associated with the at least one device, the request, or a combination thereof to determine at least one other device. The service platform then determines to cause, at least in part, an initiation of the installation of the at least one item at the at least one device, the at least one other device, or a combination thereof.

20 Claims, 11 Drawing Sheets

(56) References Cited

OTHER PUBLICATIONS

Apple, "iPhone: Using Text Messaging (SMS)", 2010, retrieved from https://web.archive.org/web/20100918025203/http://support.apple.com/kb/TA38622?viewlocale=en_US , 2 pages.*

Notification of Transmittal of The International Search Report and The Written Opinion of the International Searching Authority, or The Declaration for International Application No. PCT/FI2012/050758, dated Dec. 12, 2012, pp. 1-14.

* cited by examiner

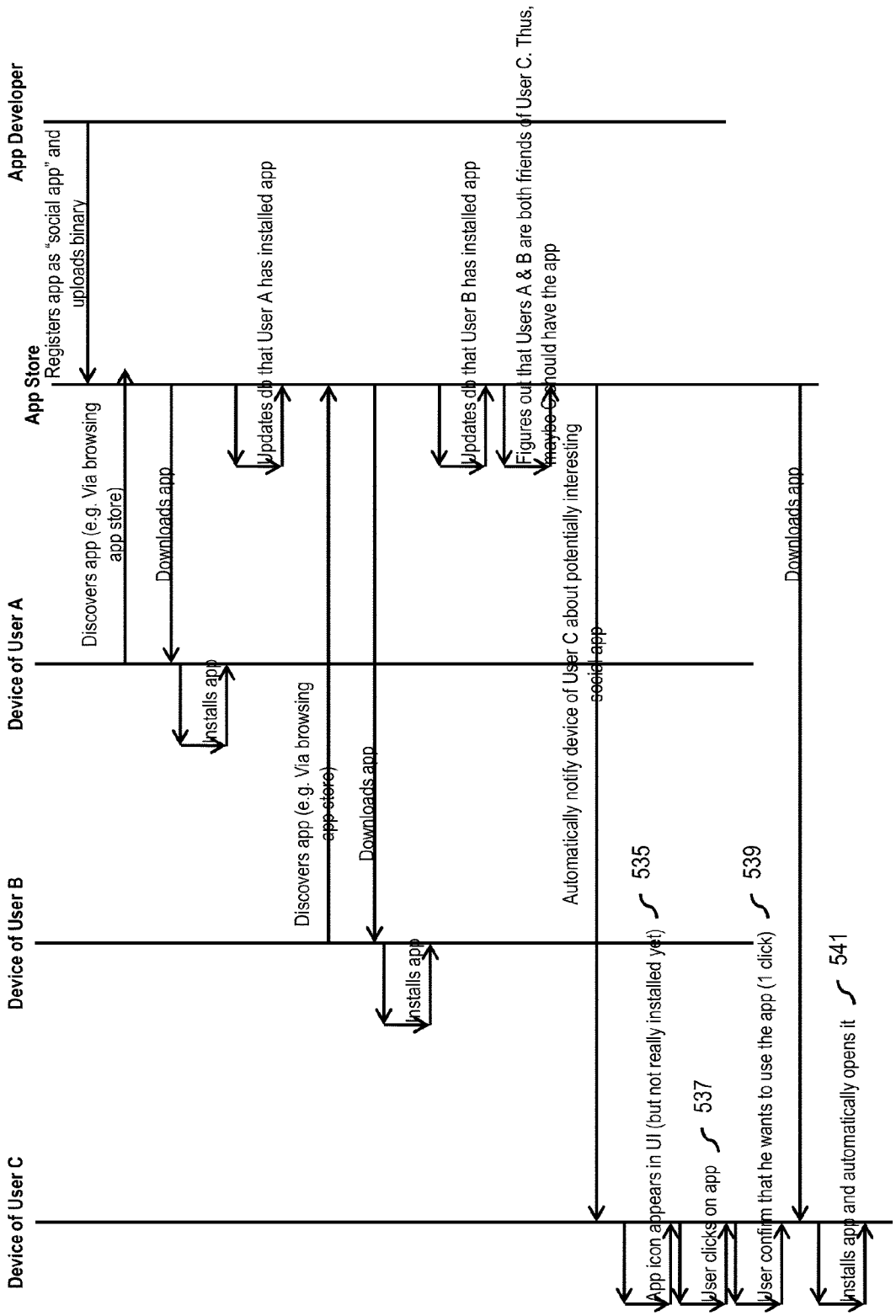

METHOD AND APPARATUS FOR SOCIALLY AWARE APPLICATIONS AND APPLICATION STORES

BACKGROUND

Service providers and device manufacturers (e.g., wireless, cellular, etc.) are continually challenged to deliver value and convenience to consumers by, for example, providing compelling network services. One area of interest has been the development of socially aware applications which typically depend on interaction among multiple clients or devices. These applications, for example, are generally available in application stores or other software repositories. However, because the number and variety of mobile platforms (e.g., Symbian, iOS, Android, WebOS, etc.) and the corresponding application stores have increased greatly, users often find it difficult to discover applications of interest. This problem is particularly acute in the context of socially aware applications where multiple devices (e.g., devices within a social network or circle) have to discover and install such applications to take advantage of the social features of the applications. Accordingly, device manufacturers and service providers face significant technical challenges to enabling discovery and installation of socially aware applications across multiple devices within a social network.

SOME EXAMPLE EMBODIMENTS

Therefore, there is a need for an approach for facilitating content item sharing (e.g., sharing of applications, media, and other device software components) by leveraging existing social networking services and infrastructure to enable content or application installation, discovery, and/or sharing.

According to one embodiment, a method comprises receiving a request from at least one device, a user account associated with the device, a service, or a combination thereof to initiate an installation of at least one item. The method also comprises processing and/or facilitating a processing of information associated with the at least one device, the request, or a combination thereof to determine at least one other device. The method further comprises determining to cause, at least in part, an initiation of the installation of the at least one item at the at least one device, the at least one other device, or a combination thereof.

According to another embodiment, an apparatus comprises at least one processor, and at least one memory including computer program code for one or more programs, the at least one memory and the computer program code configured to, with the at least one processor, cause, at least in part, the apparatus to receive a request from at least one device, a user account associated with the device, a service, or a combination thereof to initiate an installation of at least one item. The apparatus is also caused to process and/or facilitate a processing of information associated with the at least one device, the request, or a combination thereof to determine at least one other device. The apparatus is further caused to determine to cause, at least in part, an initiation of the installation of the at least one item at the at least one device, the at least one other device, or a combination thereof.

According to another embodiment, a computer-readable storage medium carries one or more sequences of one or more instructions which, when executed by one or more processors, cause, at least in part, an apparatus to receive a request from at least one device, a user account associated with the device, a service, or a combination thereof to initiate an installation of at least one item. The apparatus is also caused to process and/or facilitate a processing of information associated with the at least one device, the request, or a combination thereof to determine at least one other device. The apparatus is further caused to determine to cause, at least in part, an initiation of the installation of the at least one item at the at least one device, the at least one other device, or a combination thereof.

According to another embodiment, an apparatus comprises means for receiving a request from at least one device, a user account associated with the device, a service, or a combination thereof to initiate an installation of at least one item. The apparatus also comprises means for processing and/or facilitating a processing of information associated with the at least one device, the request, or a combination thereof to determine at least one other device. The apparatus further comprises means for determining to cause, at least in part, an initiation of the installation of the at least one item at the at least one device, the at least one other device, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing any of the methods disclosed herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The example embodiments of the invention are illustrated by way of example, and not by way of limitation, in the figures of the accompanying drawings:

FIGS. 5A-5C are ladder diagrams that illustrate a sequence of social networking-based item installations, according to one embodiment;

DESCRIPTION OF SOME EMBODIMENTS

Examples of a method, apparatus, and computer program for application and/or content item installation are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to mobile devices, it is contemplated that the various embodiments may be used with any type of device, such as desktops, notebooks, netbooks, tablets, televisions, automobiles, appliances, etc. In addition, although the various embodiments are discussed with respect to discovery and/or installation of applications, it is contemplated that the various embodiments are applicable to discovery and/or installation of any item (e.g., content items, media items, personalization items, etc. or any combination thereof) available in an application store, a network server, or otherwise for installation at a device.

Figure 1:
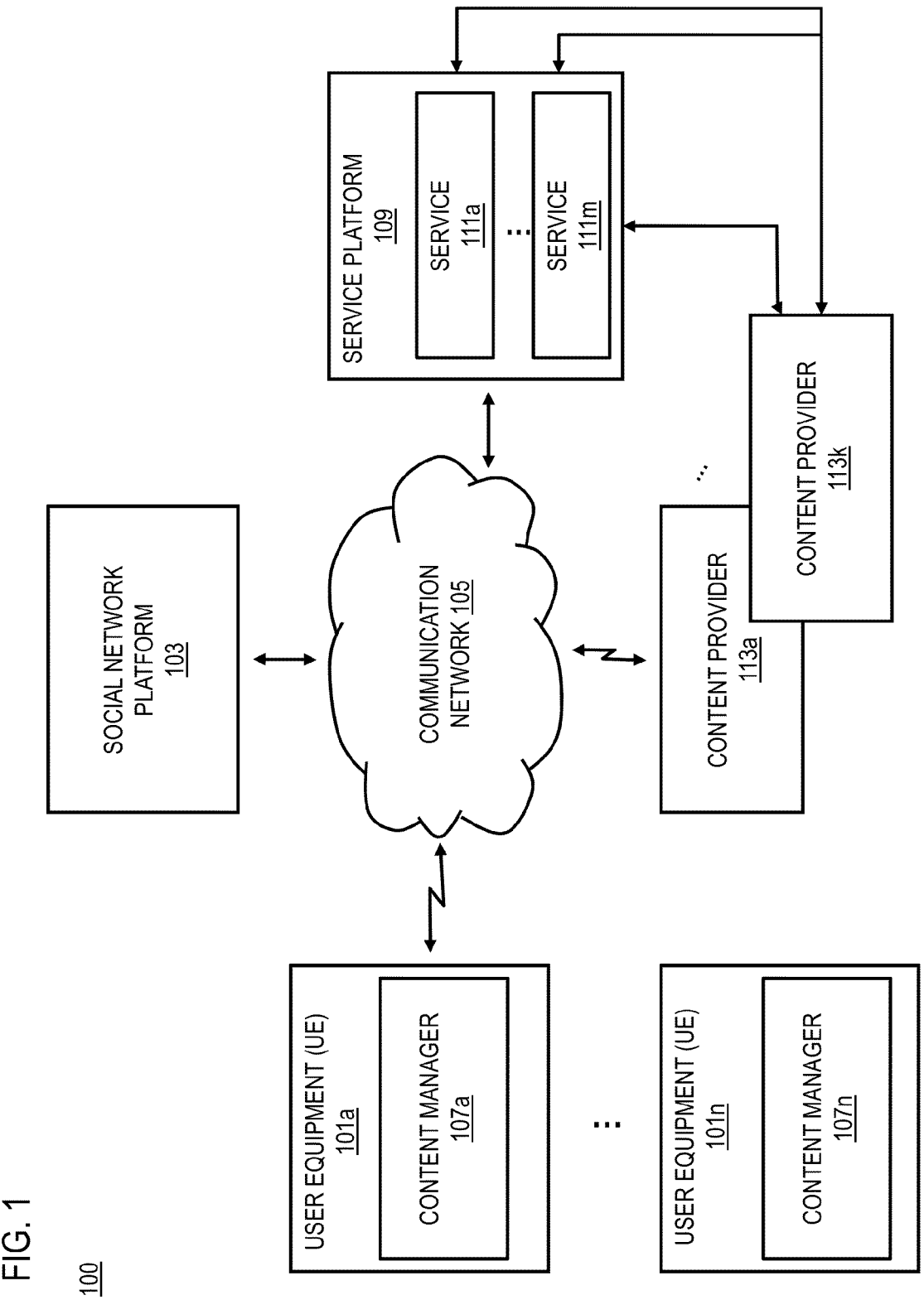
FIG. 1 is a diagram of a system capable of social networking-based item installation, according to one embodiment.

FIG. 1 is a diagram of a system capable of installing one or more items and/or applications, according to one example embodiment. As discussed, recent technological advances and developments have made sharing content items and applications on mobile devices more user friendly. For example, many mobile devices are now equipped with touch capabilities, zoom-in/zoom-out functions, Near Field Communication (NFC) or other short-range wireless technologies, etc. Applications, websites, and other content items are developed specifically for mobile devices, and services also exist to provide mobile device users with easier access to these content items. Such services include application stores that permit users to browse through many applications, read reviews, see which applications are popular, and ultimately obtain the application. However, distributing or advertising content or applications to other users may still be cumbersome, as the primary current option is to send other users messages with links to download the relevant content or applications.

In one scenario, for instance, one user may want to share a video with a second user, but the second user must install the video-sharing application to view the video. The second user in this case may receive a message (e.g. a text message), notifying him/her to install the video-sharing application in order to take advantage of the shared content. The extra steps associated with clicking on links to install the application, especially to benefit from only one content item, may deter the second user from installing the video-sharing application and viewing the shared content.

This issue is exacerbated for socially-aware applications where features of the applications are greatly enhanced as more members of a social network use the application. For example, if the application is a game, the socially aware application enables a user to play the game with friends or other contacts within a social network or circle, as well as with complete strangers. Moreover, there are many applications that rely on social features such that the applications are far more useful if a user's contacts also use the application. There are applications, for instance, that enable users to exchange pictures, videos, contacts, etc. by bumping or touching multiple devices together. However, in order for this application to work effectively, the application generally has to be installed in as many devices as possible to facilitate the greatest range and possibility to engage in such bumping interaction. Another example includes location aware social applications that enable users to locate social networking friends or contacts. Within the context of such socially aware applications, the traditional process for discovering and installing the applications among a group of devices can be complex, thereby discouraging users from using the applications.

To address this problem, a system 100 of FIG. 1 introduces the capability to automatically or manually install applications or items (e.g., socially aware applications) among devices within a social network. In other words, the system 100 enables users to more easily discover and then install applications or items that have been installed by other friends or members of one or more social networking groups or services. For example, the system 100 enables a user device to alert a user when one or more social networking friends have installed an application and the facilitate installation of the application the user's device. In one embodiment, the system 100 can initiate an automatic install of the application or otherwise lower the barrier for installing the application (e.g., preloading the application before installation, provide group purchase options for socially aware applications, provide user interface cues to discovering socially aware applications, etc.). In some embodiments, the automatic install may be initiated once a predetermined number of devices within a social networking group has installed an application. For example, once two or three social networking friends have installed an application, the system 100 can initiate an automatic install of the application on one or more other users' devices in the social networking group.

In one embodiment, the system 100 receives a request, from at least one device, to initiate an installation of at least one item. For example, the request may arrive from an invite from another device, or a notification from a database. The at least one item may, for example, include, at least in part, one or more software applications, one or more ringtones, one or more bookmarks, one or more content items, one or more media items, one or more songs, one or more videos, or some combination thereof. In one scenario, the one or more applications may be social applications where the utility of the applications increase as more of a user's friends also use the applications. Exemplary social applications include, at least in part, social networking applications, games, music, video, or contact sharing applications, friend locators, chat or messaging applications, or some combination thereof.

In one embodiment, the system 100 enables processing and/or facilitating a processing of information, such as social networking information, associated with the device to determine at least one other device. For example, processing and/or facilitating a processing of social networking information may include processing of one of more device's contact lists, group membership information, service subscription information, installed applications list, or any other resource or database, in any combination, to determine at least one other device associated with the one or more user devices.

After determining at least one other device, the system 100 may determine to cause, at least in part, installation of the item at the one device, the at least one other device, or a combination thereof. In one embodiment, causing installation may entail full installation, or merely facilitating installation such that the barrier to installation is lowered. For instance, in one scenario, the device may be prompted automatically to install an item. Or, the item may be pre-downloaded, but not fully installed until there is confirmation from the device approving installation. Another scenario may include the item being pre-installed on a secure "sand-box" until installation is accepted by the devices. Such a set-up would make the system secure, but ensure that the application is readily installed. In another scenario the device is prompted to manually initiate full or partial downloading of the item. In a further embodiment, installation may include automatically opening the item after installation.

In another embodiment, system 100 may cause, at least in part, monitoring of the one device, the at least one other device, or a combination thereof to determine a number of devices on which the installation has been completed; and causing, at least in part, an initiation of the installation on remaining ones of the one device, the at least one other device, or a combination thereof based, at least in part, on a comparison of the number of devices against at least one threshold value. One instance of such an installation may include pricing models associated with various threshold values. Once the number of devices on which installation has been completed reaches or surpasses a threshold value, the system 100 may initiate a pricing model associated with the closest surpassed threshold value. In one scenario, pricing models may offer a lower unit price as users download in bulk and drive up the number of devices with the item installed. In another scenario, a user may "gift" an item such that associated users may download the item for free or with a discount.

For another exemplary embodiment, system 100 may initiate installation on remaining devices by creating indication of the popularity of a given item. Such indication may include a rendering of at least one user interface to depict one or more steps of the installation, one or more commands associated with the installation, or a combination thereof. For instance, using an example item that is an application, in one embodiment, an application can start by being very transparent when few users in a given social network have the application installed. However, the icon may gradually become less transparent as more users in the social network install and use the application, making the application more socially relevant a user who has yet to install the application. In another embodiment, an index may explicitly indicate the number of members in a user's social network that have installed the item. The index may be a number or counter, for example. The index may also be combined with the names, faces, profile photos, or other proxy images of members of the social network using the item. In one scenario, the images may be arranged in a random, or circular manner.

As shown in FIG. 1, the system 100 comprises a user equipment (UE) 101 (or UE 101a-n) having connectivity to a social network platform 103 via a communication network 105. The UE 101 may include or have access to a content manager 107 (or content manager 107a-n) to enable the UE 101 to interact with the social network platform 103, service platform 109, one or more services 111 (or services 111a-111m) of the service platform 109, one or more content providers 113 (or content providers 113a-113k), etc. By way of example, the content manager 107 may contain contact information that includes at least one link to one or more content items. The content items may, for instance, be provided by the service platform 103, the one or more services 111, the one or more content providers 113, and/or other services available over the communication network 105. For example, a particular service 111 (e.g., a music or video service) may obtain content (e.g., media content) from a particular content provider 113 to offer the content to the UE 101. Accordingly, the link may be an address or some other identifier that points to a memory or storage location associated with the service platform 103, the services 111, and/or the content providers 113. It is noted that the content items may also be located at the social network platform 103.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the UE 101s may receive a request from the social network platform 103, content provider 113, service platform 109, or service 111, one or more user accounts associated with the UEs 101, or any combination thereof, via the communication network 105 to initiate installation of at least one item provided by the one or more social network platforms 103, one or more service platforms 109, one or more services 111, and/or one or more content providers 113, or any combination thereof. The at least one item may be installed on one or more UEs 101a-n, and monitored by respective content managers 107a-n. In one embodiment, a content manager 107 may keep track of UEs 101 associated with the at least one UE 101. In one scenario, a content manager 107 may monitor associated UEs 101 using social networking information. In one embodiment, the social network platform 103, content provider 113, service platform 109, or service 111, or any combination thereof, may then receive social networking information from one UE 101 and content manager 107 to determine other UEs 101 associated with the one UE 101. Alternatively, also functions of the content manager 107 may be implemented in the social network platform 103, content provider 113, service platform 109, or service 111, or any combination thereof.

After processing the social networking information, the social network platform 103, content provider 113, service platform 109, or service 111, or any combination thereof, may then determine to cause, at least in part, the installation of the item on the UE or UEs 101. In one embodiment, the content provider 113, content provider 113, service platform 109, or service 111, or any combination thereof, may determine various installation or installation initiation methods in accordance with the number of devices and installations determined. For example, in one embodiment, as part of the monitoring done by the content manager 107, the UE 101 and social network platform 103 may determine a number of devices on which installation has been completed. In one such system, the UE 101, social network platform 103, and content manager 107 may include a counter that tracks the associated devices and respective installations.

Given the number of devices on which installation has been completed, the social network platform 103, content provider 113, service platform 109, or service 111, or any combination thereof, may cause, at least in part, an initiation of installation on remaining devices in the social network that have not yet acquired the item. In other words, the installation and/or installation initiation may be contingent on the number of devices in a social network in which the installation has been completed. For this, in one embodiment, the social network platform 103 may work in conjunction with the content provider 113, service platform 109, service 111, or any combination thereof, to determine an installation and/or installation initiation process that is appropriate when taking into account the number of devices on which installation has been completed. In one embodiment, such numbers of devices and installation processes are arranged in terms of threshold values and associated installation. As previously mentioned, installation may involve pricing models or heuristics, various degrees of installation automation, or indicators of item popularity or urgency of installing the item.

By way of example, the UE 101, the social network platform 103, the service platform 109, and the content providers 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
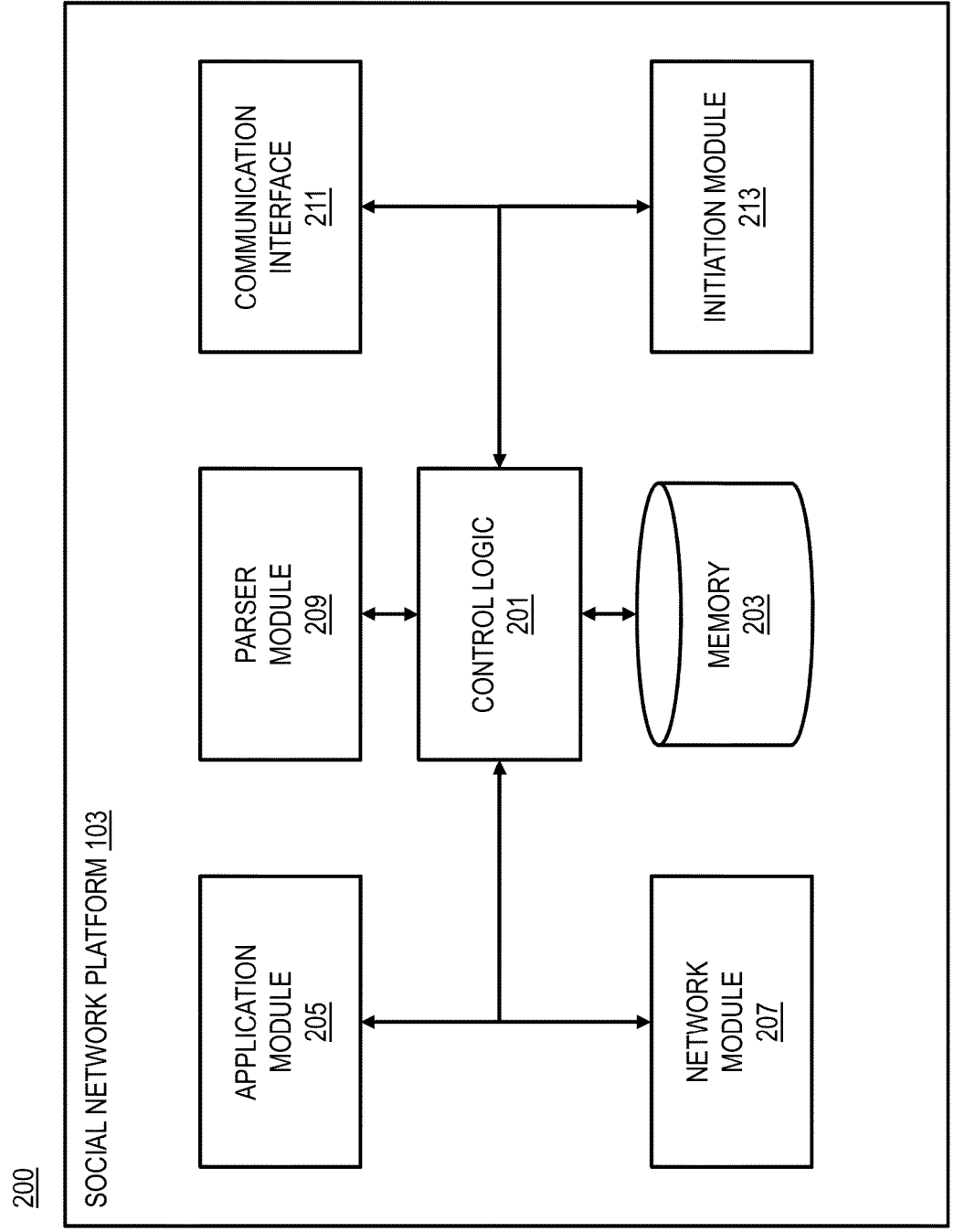
FIG. 2 is a diagram of the components of the social network platform, according to one embodiment.

FIG. 2 is a diagram of the components of a social network platform 103, according to one example embodiment. By way of example, the social network platform 103 includes one or more components for providing social networking-based item installation. It is contemplated that the functions of these components may be combined in one or more components or performed by other components of equivalent functionality. In this embodiment, the social network platform 103 includes control logic 201, memory 203, an application module 205, a network module 207, a parser module 209, a communication interface 211, and an initiation module 213. In the following embodiment, the item is taken to be an application.

The control logic 201 executes at least one algorithm for executing functions of the social network platform 103. For example, the control logic 201 may interact with the application module 205 to determine the application to be installed. Moreover, the application module may process the application information to determine users who have downloaded the application.

Next, the control logic 201 may direct the network module 207 to determine whether the contacts associated with the UE 101 are also associated with the application. To do so, the network module 207 may process the contact information, social group information, or social network information, or any combination thereof, of a device to detect all the contacts associated with a certain device.

The control logic 201 may then cause the parser module 209 to determine associations between the application to be installed, and contacts found in contact information, social group information, or social network information, or any combination thereof. In addition, the parser module 209 may have a counter to track the number of matches. This number may serve as an indication of members in a given social network that share an application. To illustrate, in one instance, application module 205 may determine that a video-sharing application is to be installed on one device. Network module 207 may run an inventory of the devices associated with that one device. Parser module 209 may then determine the devices associated with that one device, that already have the video-sharing application installed. Furthermore, parser module 209 may note the devices associated with the device that do not yet have the video-sharing application installed.

The control logic 201 may also utilize the communication interface 211 to communicate with other components of the content manager 107, the UEs 101, the service platform 109, the content providers 113, and other components of the system 100. The communication interface 211 may include multiple means of communication. For example, the communication interface 211 may be able to communicate over SMS, internet protocol, instant messaging, voice sessions (e.g., via a phone network), or other types of communication.

The initiation module 213 may determine whether the counter or number of contacts associated with the application, is associated with a particular installation initiation process. In one embodiment, installation or installation initiation may vary based on the number of associated devices that already have the application installed. In a possible embodiment, various pricing models or heuristics may be associated with numbers of associated devices. For example, perhaps there may be various threshold numbers of associated devices that trigger given pricing models. In one scenario, the pricing models may be set such that prices per unit decrease as the number of associated devices increases. In another embodiment, installation may be facilitated based on the number of associated devices. For example, a device may be prompted to install an item once devices associated with the device have the item installed.

Alternatively, installation itself may involve more automation as more associated devices are also associated with the item. For instance, the system 100 might automatically install an item to a device associated with other devices that already have the item installed. In a further embodiment, automatic installation may be initiated once a device is associated with a threshold number of other devices that already have item installed. In another instance, a device may pre-download the item, but not install it, so that the item is readily installed when the user clicks on the item installation confirmation. Lastly, the device might pre-install the item on a secure "sand-box", and move it to the device when the user accepts installation.

In another embodiment, the addition of associated devices may be indicated to the user to convey urgency or need for downloading the item. For example, the control logic 201 may cause, at least in part, a rendering of at least one user interface to depict one or more steps of the installation, one or more commands associated with the installation, or a combination thereof.

Figure 3:
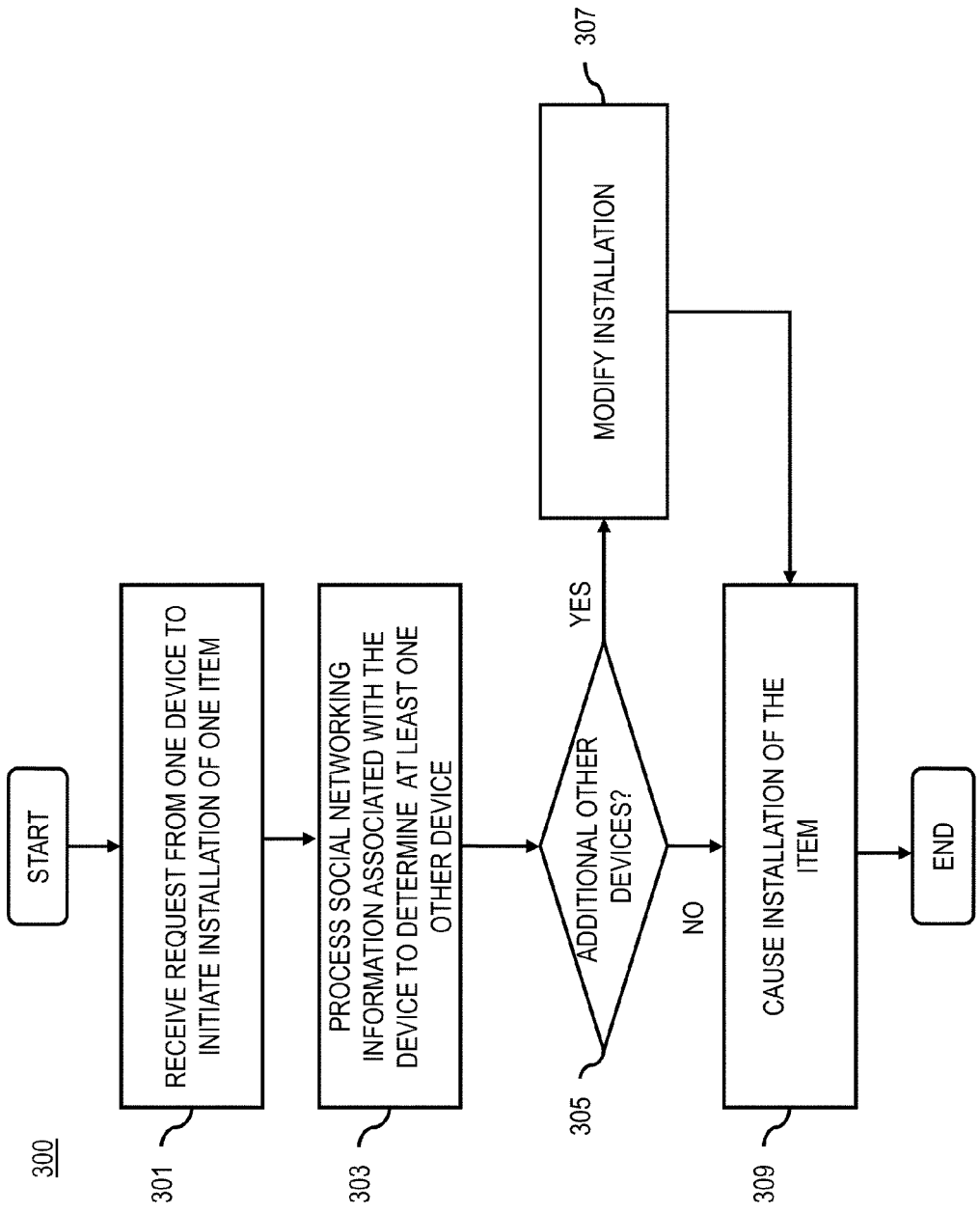
FIG. 3 is a flowchart of a process for initiating social networking-based item installation, according to one embodiment.
Figure 8:
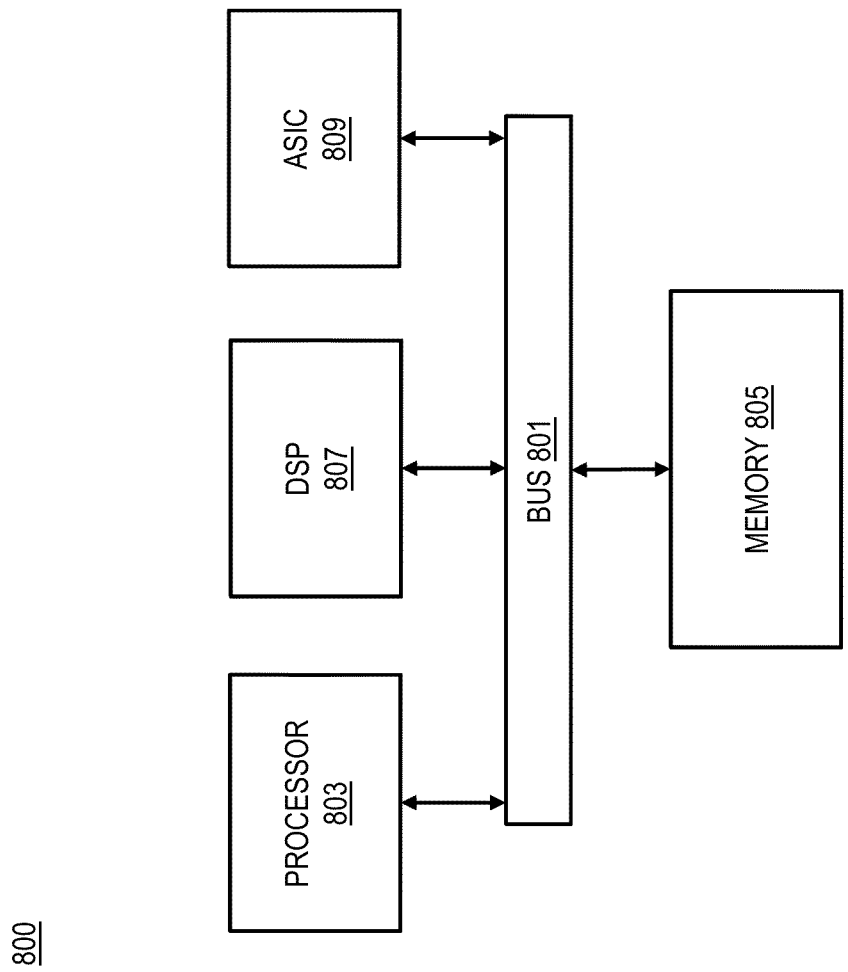
FIG. 8 is a diagram of a chip set that can be used to implement an embodiment of the invention.

FIG. 3 is a flowchart of a process for social networking-based item installation, according to one example embodiment. In one embodiment, the social network platform 103 performs the process 300 and it is implemented in, for instance, a chip set including a processor and a memory as shown in FIG. 8. In step 301, the control logic 201 may receive a request from at least one device (e.g., a UE 101), a user account associated with the device, a service 111, or a combination thereof to initiate an installation of at least one item. In one embodiment, the at least one item includes for example, at least in part, one or more applications, one or more ringtones, one or more bookmarks, one or more content items, or some combination thereof. The control logic 201 may then employ the parser module 209 to process and/or facilitate a processing of information (e.g., social networking information) associated with the at least one device, the request, or a combination thereof to determine at least one other device, as in step 303. With step 305, the control logic 201 may direct the parser module 209 to count the associated other devices. If there are various forms of installation contingent on the number of associated other devices, the control logic 201 and initiation module 213 may process and/or facilitate a processing of the social networking information to determine at least one pricing model for the at least one item, the installation, or a combination thereof. Thus for step 307, the control logic 201 and initiation module 213 may determine to modify installation according to the number of associated other devices (step 307). For step 309, the control logic may determine to cause, at least in part, an initiation of the installation of the at least one item at the at least one device, the at least one other device, or a combination thereof. Alternatively, also the content provider 113, service platform 109, service 111, or any combination thereof, can perform the process 300.

Figure 4:
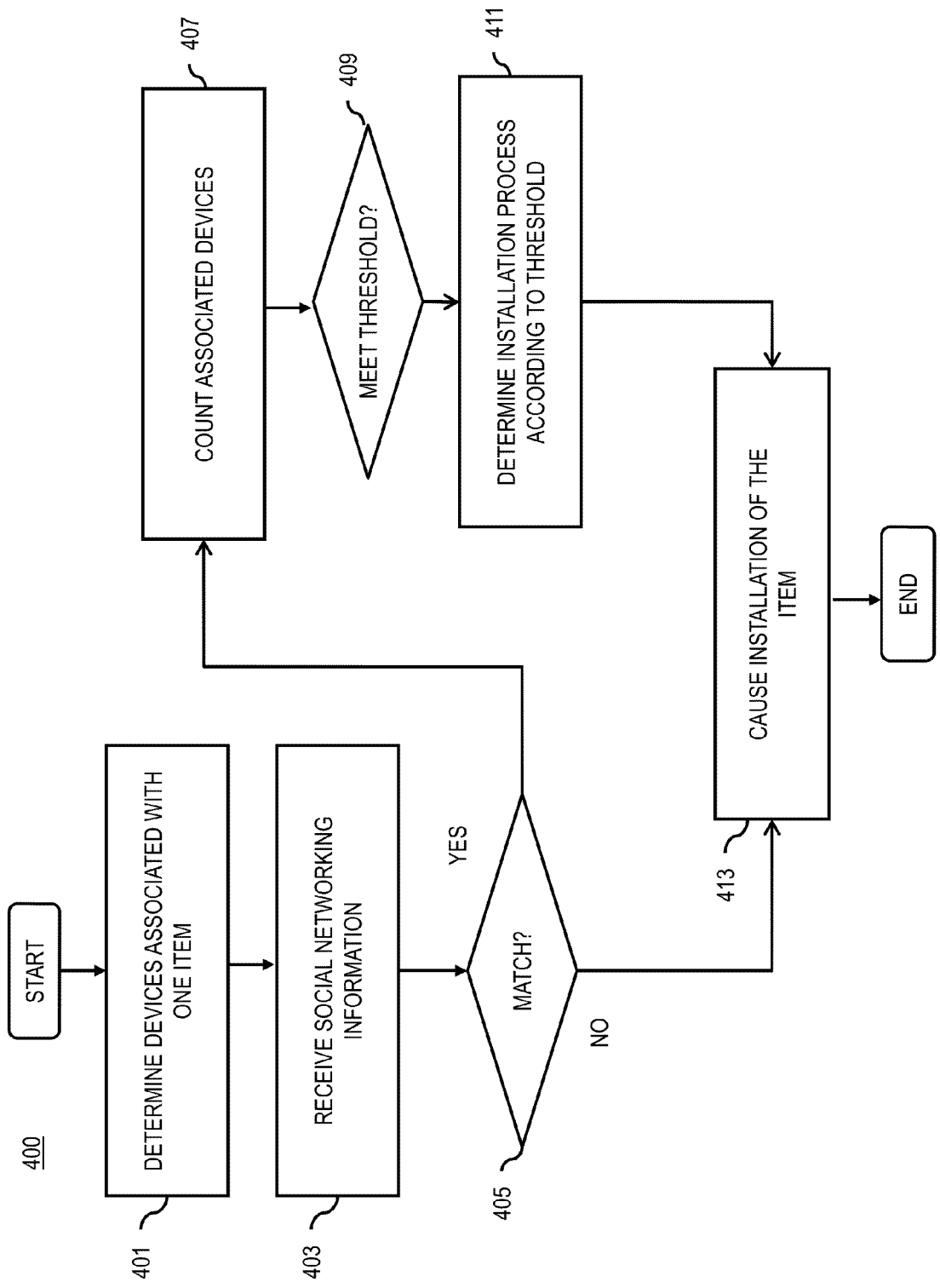
FIG. 4 is a flowchart of a process for processing social networking information to determine at least one other device, according to various embodiments.

FIG. 4 is a flowchart of a process 400 for processing and/or facilitating a processing of information, such as social networking information, associated with the device to determine at least one other device according to one example embodiment. The process 400 may be executed in the social network platform 103, content provider 113, service platform 109, or service 111, or any combination thereof. First with step 401, the control logic 201 may work in conjunction with the application module 205, for instance, to determine devices associated with the one item. For step 403, the control logic 201 may then receive information (e.g., social networking information) about the determined devices using the network module 207. Once both the devices associated with the item and the devices associated with the device are determined, the two categories may be compared. This is step 405, through which the control logic 201 may determine at least one other device by processing the determined information.

Following step 405, the control logic 201 may cause, at least in part, a monitoring of the at least one device, the at least one other device, or a combination thereof to determine a number of devices on which the installation has been completed. In one embodiment, the control logic 201 may then count the number of devices on which the installation has been completed by counting the devices (step 407). After counting the devices, the control logic 201 may determine a scale of threshold values that may be associated with various installation processes. With step 409, the control logic 201 may determine whether the device count meets any threshold values, and cause, at least in part, an initiation of the installation on remaining ones of the at least one device, the at least one other device, or a combination thereof based, at least in part, on a comparison of the number of devices against at least one threshold value.

Step 411 involves control logic 201 determining installation processes according to threshold value. One instance of determining one or more appropriate installation processes may involve the control logic determining an installation history, a use history, or a combination thereof associated with the at least one item, wherein one or more characteristics of a rendering is based, at least in part, on the installation history, the use history, or a combination thereof. In one scenario, this may mean a rendering of an item download icon appearing fairly transparent initially, then increasing in opacity as more devices associated with a user's device acquire the item. Such a function may alert a user device that an item is increasing in popularity among the associated devices, and increase the urgency of installing the item.

Alternately, or in addition, for step 411 and 413, the control logic 201 may cause, at least in part, a preloading of one or more components of the at least one item at the at least one device, the at least one other device, or a combination thereof, wherein the installation is based, at least in part, on the preloading. For example, if the number of associated devices meets a certain threshold, installation is made more automatic via the preloading. In another embodiment, for step 411 and step 413, the control logic 201 may cause, at least in part, the installation to occur in a secure domain of the at least one device, the a least one other device, or a combination thereof.

At any stage of installation initiation, the control logic 201 may cause, at least in part, a presentation of a prompt requesting a confirmation for the installation, wherein the installation is based, at least in part, on at least on response to the installation. For example, the control logic 201 may request a confirmation for installation from UE 101 via the communication network 105. Once a response from UE 101 is received, the control logic 201 may prompt the initiation module 213 and/or the service platform 109 and content provider 113 to begin installation. In one scenario, installation is pending until confirmation is received from UE 101. In one embodiment, the prompt for confirmation may occur, at least in part, after a rendering of an application icon, completely prior to loading, after preloading, or a combination thereof.

Step 413 may also include the control logic 201 causing installation, wherein the installation further comprises configuring the at least one item to interoperate among the at least one device, the at least one other device, or a combination thereof. In one embodiment, such interoperation may include automatically loading the item with the social networking information. For example, if the item is a messenger or chat service, step 413 may include populating the contact list of the item with members of the UE 101's social network who also have the item installed.

Figure 5A:
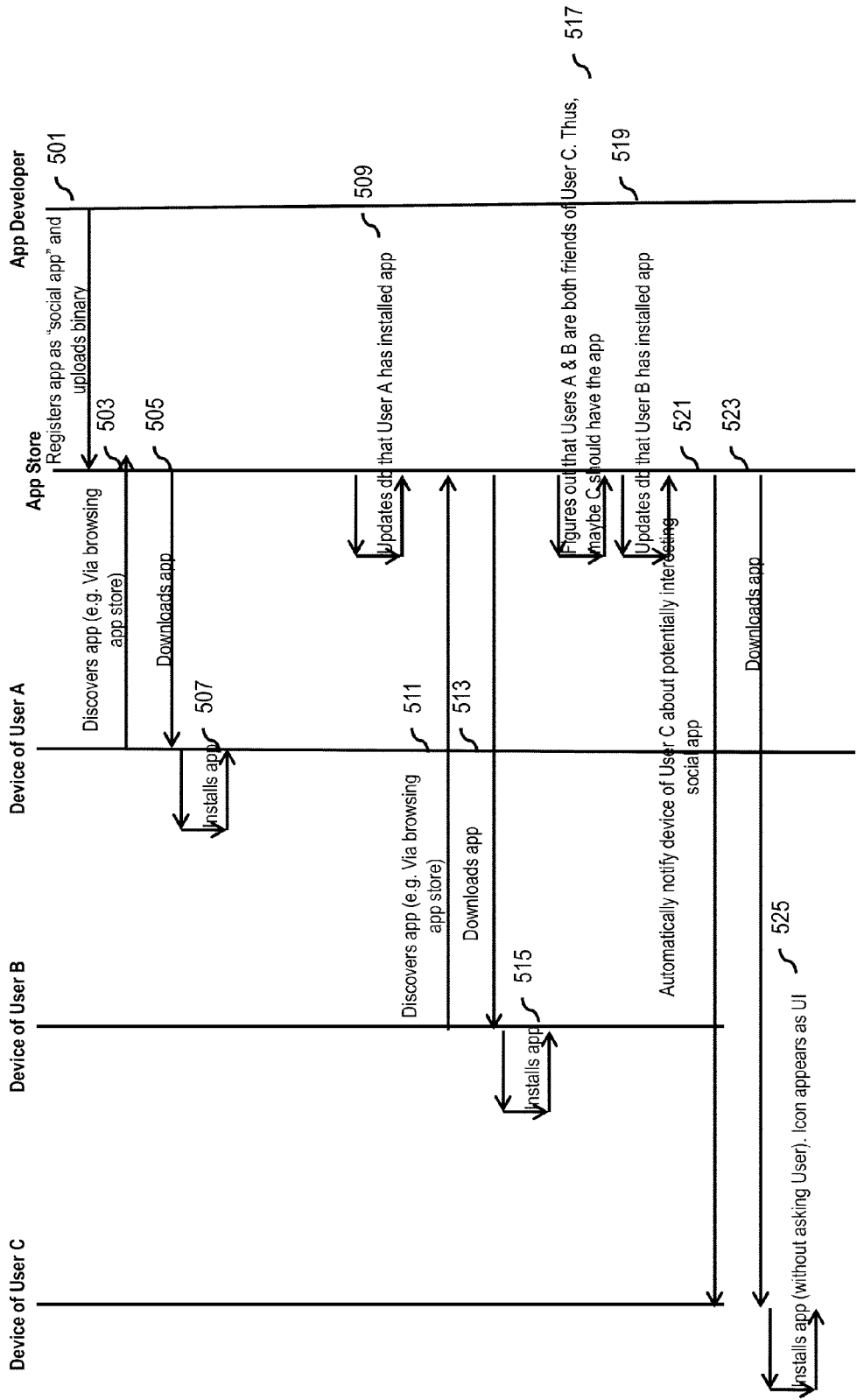
Figure 5B:
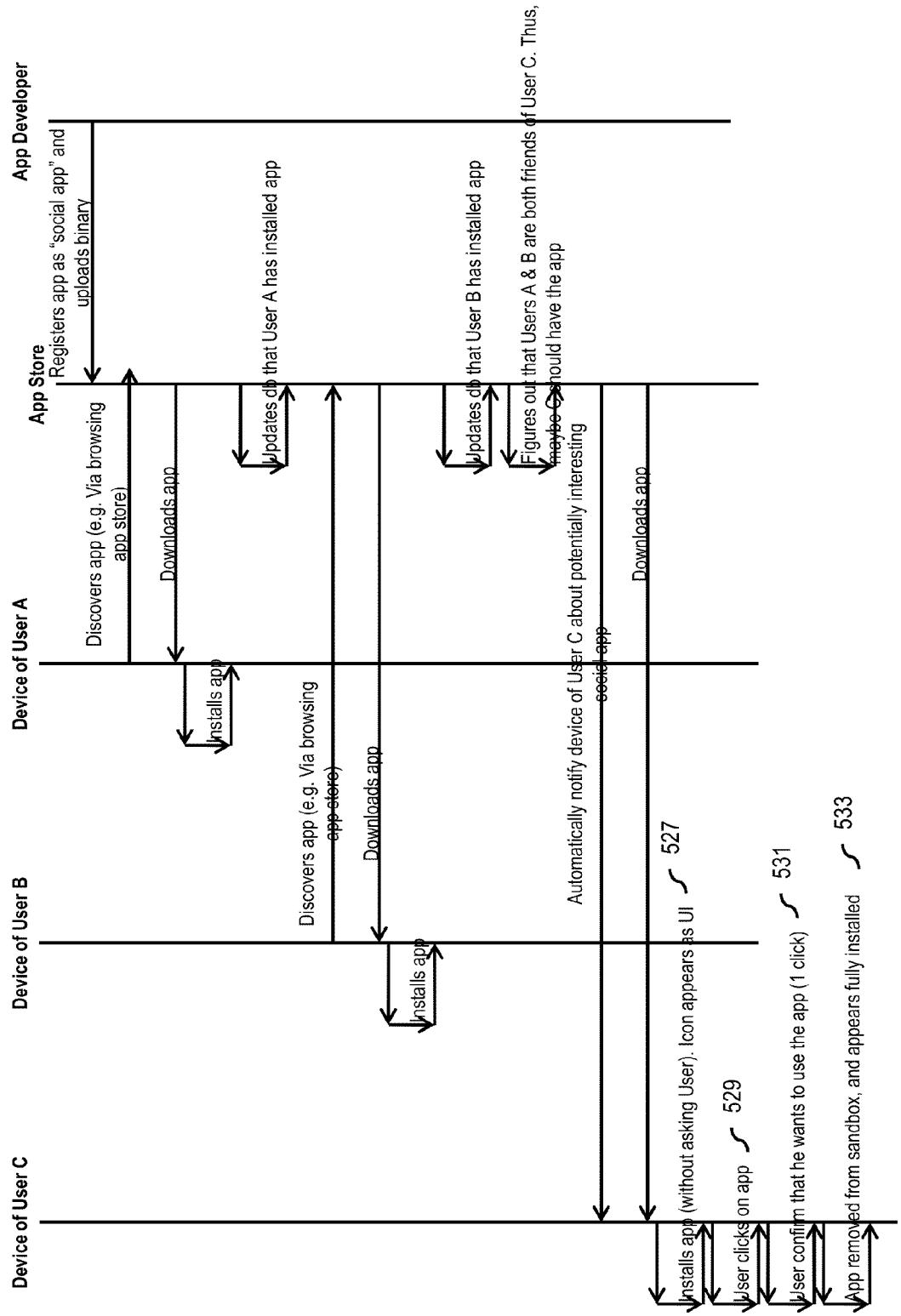

FIGS. 5A-5C are sequence diagrams that illustrate a sequence of item acquisition and installation, according to example embodiments. A step or message passed from one process to another is represented by horizontal arrows. More specifically, FIGS. 5A-5C illustrates a process for using the processes of FIGS. 3 and 4 to support multiparty communications for initiating and installing items using information from, for instance, the social network platform 103, content provider 113, service platform 109, or service 111, the communication network 105, as well as mobile devices (e.g., UEs 101), or any combination thereof. Of the embodiments proposed, FIGS. 5A-5C focus on various embodiments related to item installation.

In one embodiment depicted in FIG. 5A, a mobile device receives an item (step 505). In the instance shown, the mobile device receives an application identified as a "social application" from an application store. In one embodiment, the application may be received as a peer-to-peer (P2P) message directly to UE 101 or content manager 107 for presentation in the UE 101's user interface. The application may be received using a communication identifier associated with the item from content provider 113. In addition or alternatively, the application may be received via an alternate mode of communication such as e-mail or text messaging.

In one embodiment, items received and installed on mobile devices are applications, for example social applications. In step 501, an application developer may register an application as a "social application." In one scenario, such registration is uploaded as a binary to an application store, that is, for instance, the social network platform 103, content provider 113, service platform 109, or service 111, or any combination thereof "Social applications" may be applications that benefit from more people in a social network using it, including social networking applications, applications that permit sharing of content items such as pictures, videos, or contacts, location awareness applications, chat or messaging applications, or a combination thereof. In other words, the utility of the application greatly increases if devices associated with a particular device, for instance in the form of contacts, also have the application installed on their device.

In step 503, the device of user A, UE 101a, discovers the social application at the application store where the social application has been uploaded. With step 505, UE 101a receives a social application from an application store and downloads the application. After downloading the application, UE 101 may install the application as in step 507. As previously discussed, installation may occur, at least in part, automatically or manually, after user confirmation, or a combination thereof. This installation may trigger step 509, updating a database with the data that UE 101a has installed an application. In one embodiment, the database may be located at the social network platform 103, service platform 109, service 111, and/or content provider 113 to keep track of UEs 101 that have installed an application.

At step 511, another UE 101b, the device of user B, may discover the application while browsing the application store and consequently download the application (step 513). In one example embodiment, UE 101b is not in the social network of UE 101a, so UE 101b independently downloads the application from the application store without a lowered barrier of installation. Upon installation, step 515, the UE 101b may provide a response message to the communication network 105 to update the database in either the social network platform 103, service platform 109, service and/or content provider 113 with the data that UE 101b has installed the application (step 517).

At step 519, the social network platform 103, content provider 113, service platform 109, or service 111, or any combination thereof, may process social networking information to determine that UE 101a and UE 101b are both in the social network of the device of user C, UE 101c, and therefore prompt UE 101c to install the application. UE 101c may be prompted to install the application in a number of ways. In one embodiment using step 521, the communication network 105 may automatically notify UE 101c, the device of user C, about the social application that may be relevant to user C, now that members of his social network are using it. As UEs 101 install the application, the application may become more useful to other UEs 101 in a given social network. In one embodiment, such social relevance may trigger step 523 of sending a message through the communication network 105 to the social network platform 103, service platform 109, service 111, or content provider 113, or any combination thereof, to download the application onto UE 101c. In one instance, social relevance may be so automated that the message sent from the communication network 105 includes step 525 of installing the application without a message confirming installation from UE 101c. Step 525 may also include generating a rendering on the user interface of UE 101c of the icon associated with the application. Such a rendering may indicate to user C that UE 101c has a new application available for use.

In another embodiment depicted in FIG. 5B, rather than automatically installing the application without confirmation from UE 101c, the social network platform 103 may employ step 529, which includes installing the application in a secure domain, without a confirmation message from UE 101c. One example of a secure domain is a "sandbox." In one scenario, UE 101c, the social network platform 103, the service platform 109, service 111, or the content provider 113, or any combination thereof, may cause, at least in part, a rendering on the user interface of UE 101c of an icon associated with the application. Such an icon may serve as an indication of the application's lowered barrier to installation since the application is already readily downloaded in a sandbox. In step 529, the user may click on the icon to initiate bring about step 531. For step 531, the UE 101c may send a confirmation message to the communication network 105 approving installation. Such a confirmation message may be received by the social network platform 103, service platform 109, service 111, or content provider 113, or any combination thereof, to remove the application from a sandbox and install it on UE 101c (step 533). In one embodiment, as part of step 533, the installation may include updating the rendering to include some change to indicate that the application is fully installed on the UE 101c. As previously discussed, one example of this change, may be a darkening of color or opacity of the application icon.

In a further alternate embodiment, step 521 of notifying UE 101c of a relevant social application may not directly, immediately trigger installation. Instead, in one possible instance, the notification prompts step 535 of creating a rendering on the user interface on UE 101c that includes, at least in part, a display of the icon associated with the social application. In one iteration of this instance, the rendering of the icon is independent from installation or download of the application. Step 535 may not always include installation. After step 535 of rendering the icon, step 537 may occur where the user clicks on the rendering of the application icon. Clicking on the rendering may activate step 539, wherein user C may confirm installation of the application on UE 101c. As discussed above, step 539 of confirming installation may involve causing UE 101c to send a confirmation message to the social network platform 103, the service platform 109, the service 111, or the content provider 113, or any combination thereof, to initiate installation on UE 101c. In one embodiment, step 541 may then follow, where the social network platform 103 may install the application on UE 101c. In one instance, installation in step 541 may include automatically opening the application.

Figure 6:
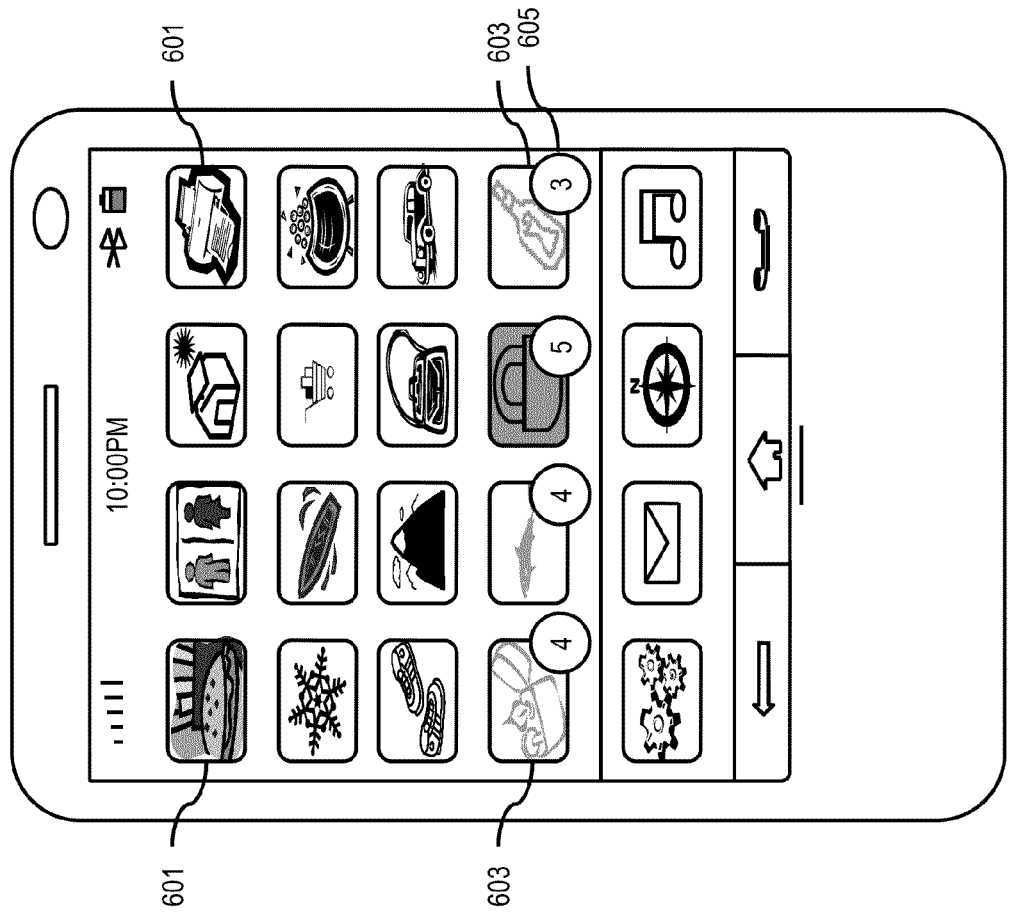
FIG. 6 is a diagram of a user interface utilized in the processes of FIGS. 3-4, according to various embodiments.

FIG. 6 is a diagram of a user interface utilized in the processes of FIG. 3-4, according to one example embodiment. FIG. 6 illustrates a user interface 600 that features a collection of icons for items, such as applications. Icons 601 are icons for items installed on the device, while icons 603 are icons for items installed in the social network of the user, but not yet on the user device. The transparency or lighter coloration of the icon 603 denotes the status of the item as having a lower installation barrier, but not yet installed. In one embodiment, transparency of the icon 603 may decrease as more members of the social network install the item. Similarly, the icons 603 may become more opaque or darker as more associated devices install the item. As shown, the icons 603 may also include respective counters 605 or other graphical element to explicitly indicate the number of other associated devices that have already installed the corresponding items. Alternatively, the icons 603 may have an additional graphical indicator to show that the specific application is not yet downloaded in the UE 101. Additionally, the icons 603 may graphically indicate, e.g., names of persons, images of persons, number of persons, or any combination thereof, that have already downloaded the specific application.

In one embodiment, selecting icon 603 may lead to the source for the user device to acquire the item, such as an application store. Alternately, selecting icon 603 may install the item. The item may even be automatically opened upon selection of 603. Or, selecting icon 603 may permit the user device to complete installation of the item since the item was pre-downloaded once it was in the social network.

The processes described herein for social networking-based item installation may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
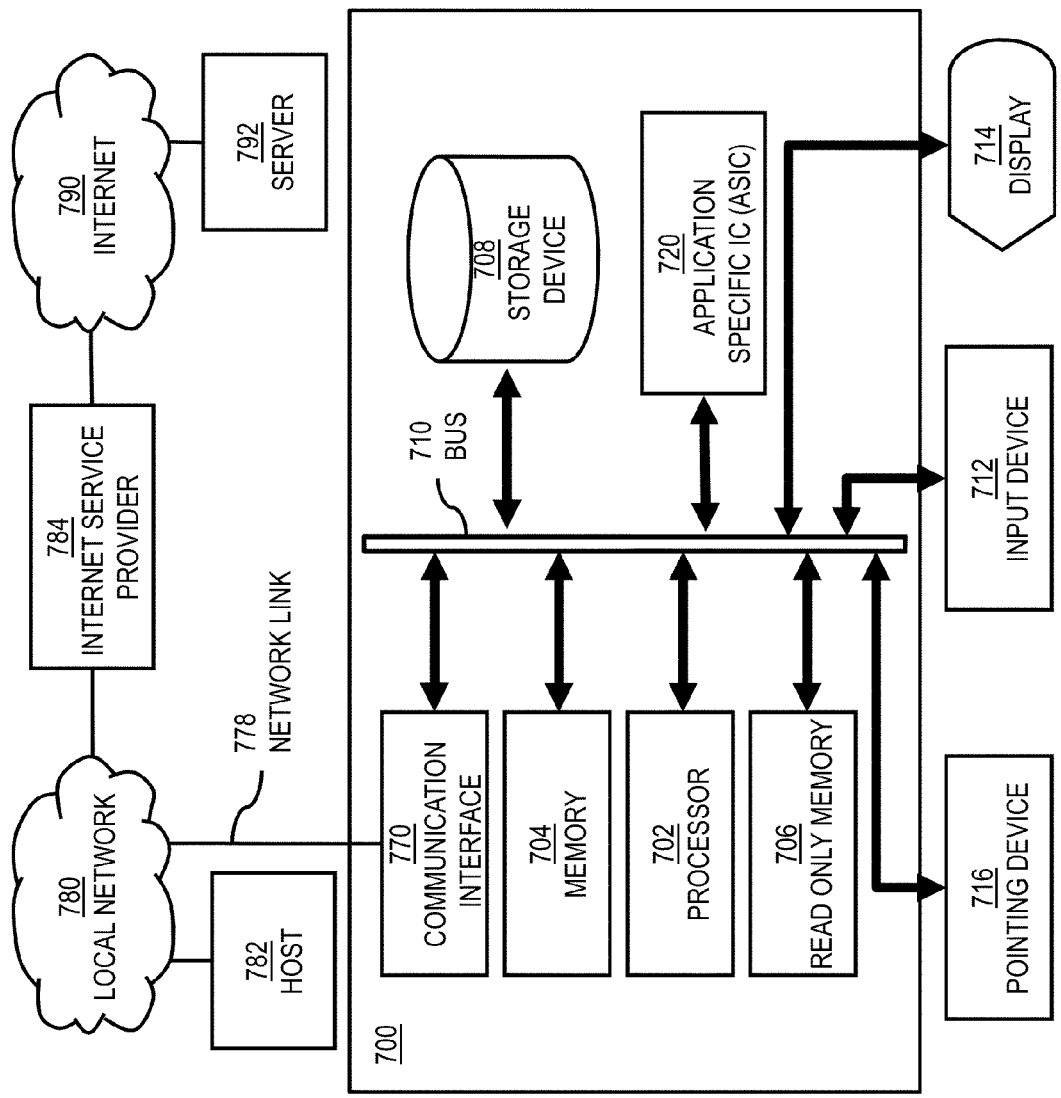
FIG. 7 is a diagram of hardware that can be used to implement an embodiment of the invention.

FIG. 7 illustrates a computer system 700 upon which an embodiment of the invention may be implemented according to one example embodiment. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) for social networking-based item installation as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of social networking-based item installation.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to social networking-based item installation. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for social networking-based item installation. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for social networking-based item installation, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for social networking-based item installation to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented according to one example embodiment. Chip set 800 is programmed to permit social networking-based item installation described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of social networking-based item installation.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to permit social networking-based item installation. The memory 805 also stores the data associated with or generated by the execution of the inventive steps.

Figure 9:
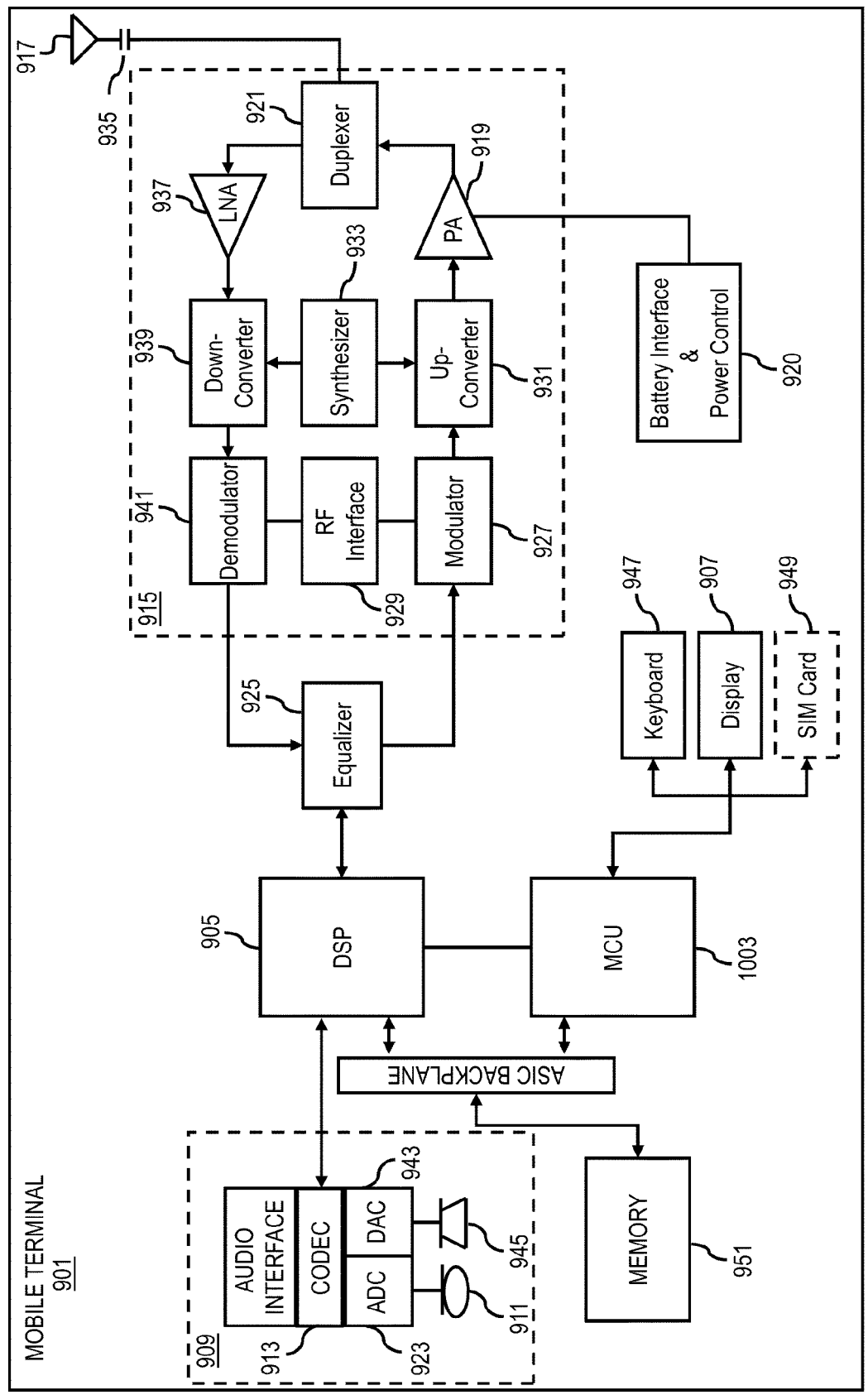
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one example embodiment. In some embodiments, mobile terminal 901, or a portion thereof, constitutes a means for performing one or more steps of permitting social networking-based item installation. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of permitting social networking-based item installation. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to permit social networking-based item installation. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    a request, from at least one device, a user account associated with the device, a service, or a combination thereof, to initiate an installation of at least one item;
    a processing of information associated with the at least one device, the request, or a combination thereof to determine at least one other device;
    a notification, to the at least one other device, of the installation of the at least one item on the at least one device; and
    at least one determination to cause, at least in part, an initiation of the installation of the at least one item at the at least one device, the at least one other device, or a combination thereof.

2. A method of claim 1, wherein the (1) data and/or (2) information and/or (3) at least one signal are further based, at least in part, on the following:
    a monitoring of the at least one device, the at least one other device, or a combination thereof to determine a number of devices on which the installation has been completed; and
    an initiation of the installation of the at least one item on remaining ones of the at least one device, the at least one other device, or a combination thereof based, at least in part, on a comparison of the number of devices against at least one threshold value.

3. A method of claim 1, wherein the (1) data and/or (2) information and/or (3) at least one signal are further based, at least in part, on the following:
    a rendering of at least one user interface to depict one or more steps of the installation, one or more commands associated with the installation, or a combination thereof.

4. A method of claim 3, wherein the (1) data and/or (2) information and/or (3) at least one signal are further based, at least in part, on the following:
    an installation history, a use history, or a combination thereof associated with the at least one item,
    wherein one or more characteristics of the rendering are based, at least in part, on the installation history, the use history, or a combination thereof.

5. A method of claim 1, wherein the (1) data and/or (2) information and/or (3) at least one signal are further based, at least in part, on the following:
    a presentation of a prompt requesting a confirmation for the installation,
    wherein the installation is based, at least in part, on at least one response to the confirmation.

6. A method of claim 1, wherein the (1) data and/or (2) information and/or (3) at least one signal are further based, at least in part, on the following:
    a preloading of one or more components of the at least one item at the at least one device, the at least one other device, or a combination thereof,
    wherein the installation of the at least one item is based, at least in part, on the preloading.

7. A method of claim 1, wherein the (1) data and/or (2) information and/or (3) at least one signal are further based, at least in part, on the following:
    at least one determination to cause, at least in part, the installation to occur in a secure domain of the at least one device, the at least one other device, or a combination thereof.

8. A method of claim 1, wherein the installation further comprises configuring the at least one item to interoperate among the at least one device, the at least one other device, or a combination thereof.

9. A method of claim 1, wherein the (1) data and/or (2) information and/or (3) at least one signal are further based, at least in part, on the following:
    a processing of the information to determine at least pricing model for the at least one item, the installation, or a combination thereof.

10. A method of claim 1, wherein the at least one item includes, at least in part, one or more applications, one or more ringtones, one or more bookmarks, one or more content items, or some combination thereof.

11. An apparatus comprising:
    at least one processor; and
    at least one memory including computer program code for one or more programs, the at least one memory and the computer program code configured to, with the at least one processor, cause the apparatus to perform at least the following,
    receive a request, from at least one device, a user account associated with the device, a service, or a combination thereof, to initiate an installation of at least one item;
    process and/or facilitate a processing of information associated with the at least one device, the request, or a combination thereof to determine at least one other device;

transmit a notification, to the at least one other device, of the installation of the at least one item on the at least one device; and determine to cause, at least in part, initiation of the installation of the at least one item at the at least one device, the at least one other device, or a combination thereof.

12. An apparatus of claim 11, wherein the apparatus is further caused to:

cause, at least in part, a monitoring of the at least one device, the at least one other device, or a combination thereof to determine a number of devices on which the installation has been completed; and cause, at least in part, an initiation of the installation of the at least one item on remaining ones of the at least one device, the at least one other device, or a combination thereof based, at least in part, on a comparison of the number of devices against at least one threshold value.

13. An apparatus of claim 11, wherein the apparatus is further caused to:

cause, at least in part, a rendering of at least one user interface to depict one or more steps of the installation, one or more commands associated with the installation, or a combination thereof.

14. An apparatus of claim 13, wherein the apparatus is further caused to:

determine an installation history, a use history, or a combination thereof associated with the at least one item, wherein one or more characteristics of the rendering are based, at least in part, on the installation history, the use history, or a combination thereof.

15. An apparatus of claim 11, wherein the apparatus is further caused to:

cause, at least in part, a presentation of a prompt requesting a confirmation for the installation, wherein the installation is based, at least in part, on at least one response to the confirmation.

16. An apparatus of claim 11, wherein the apparatus is further caused to:

cause, at least in part, a preloading of one or more components of the at least one item at the at least one device, the at least one other device, or a combination thereof, wherein the installation of the at least one item is based, at least in part, on the preloading.

17. An apparatus of claim 11, wherein the apparatus is further caused to:

cause, at least in part, the installation to occur in a secure domain of the at least one device, the at least one other device, or a combination thereof.

18. An apparatus of claim 11, wherein the installation further comprises configuring the at least one item to interoperate among the at least one device, the at least one other device, or a combination thereof.

19. An apparatus of claim 11, wherein the apparatus is further caused to:

process and/or facilitate a processing of the information to determine at least pricing model for the at least one item, the installation, or a combination thereof.

20. An apparatus of claim 11, wherein the at least one item includes, at least in part, one or more applications, one or more ringtones, one or more bookmarks, one or more content items, or some combination thereof.

* * * * *